Figure 1:
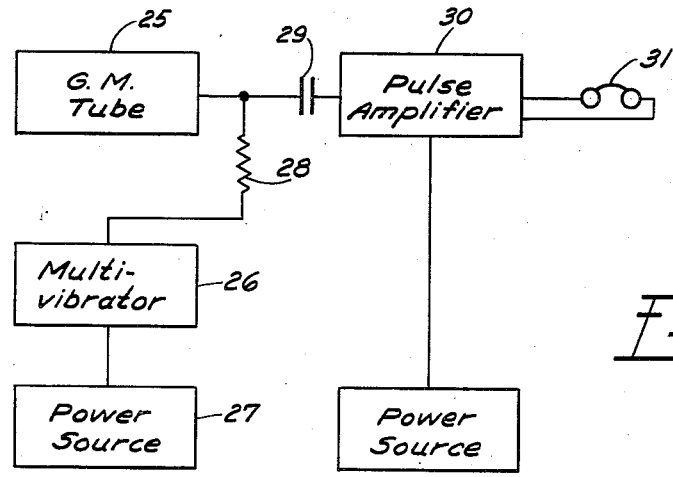

Feb. 25, 1958    J. C. GUNDLACH ET AL    2,824,973
RADIATION DETECTOR SYSTEM
Filed Feb. 11, 1954

INVENTORS
Joseph C. Gundlach &
BY  George G. Kelley

ATTORNEY

United States Patent Office
2,824,973
Patented Feb. 25, 1958

2,824,973
RADIATION DETECTOR SYSTEM

Joseph C. Gundlach, Loudon County, and George G. Kelley, Kingston, Tenn., assignors to the United States of America as represented by the United States Atomic Energy Commission Application February 11, 1954, Serial No. 409,784

10 Claims. (Cl. 250—83.6)

This invention relates to radiation detecting devices and systems and more particularly to an arrangement for supplying power to a radiation detecting instrument which is especially suited to portability.

In the portable radiation survey instruments and systems of the prior art, a major part of the size and weight of the equipment was taken up by batteries which constituted the power supplies. In one such radiation detecting system 900 volts were required for the Geiger-Mueller counter tube. This necessitated the use of some 20 small 45 volt hearing aid cells to provide the necessary potential, so that the resulting package became undesirably bulky and cumbersome for portable use. Moreover, in the conventional power supply available for such use, vacuum tubes were required. Since the filament and other power requirements of these tubes were added to those which were necessitated by such operating circuits as the pulse amplifier of the device, the bulk and weight of the package was further increased by the batteries necessary to meet these additional requirements.

Applicants with a knowledge of the problems of the prior art have for an object of their invention the provision of a power supply for a radiation detecting device which will reduce the bulk and weight of the package and will make it more suitable for portability.

Applicants have as another object of their invention the provision of a radiation detecting system which reduces the number of vacuum tubes while preserving the operativeness of the arrangement.

Applicants have as another object of their invention the provision of a power supply unit for a radiation detecting device employing a storage condenser which is recharged to the same extent that it has been discharged by the detection of a nuclear event and the passage of the resulting signal through the system.

Applicants have as a further object of their invention the provision of a power supply for a radiation detecting device which will compensate for the changes in voltage requirements resulting from temperature changes and ageing of the radiation detecting device.

Applicants have as a still further object of their invention the provision of a power supply source for a radiation detecting device employing a storage capacitor which is replenished each time radiation produces a pulse so that background radiation and cosmic rays may serve to operate the system sufficiently often to maintain a charge on the condenser of such magnitude as will keep the system in operative condition and overcome the effects of current leakage which may be present therein.

Applicants have as a still further object of their invention the provision of a power supply for a radiation detecting device which conserves power consumption, since charge is only supplied for the device when it is needed.

Applicants have as a still further object of their invention the provision of a radiation detecting system wherein a multivibrator is employed to serve the dual function of a power supply for the detector, and as a means for converting nuclear events into audible signals.

Other objects and advantages of our invention will appear in the following specification and accompanying drawings, and the novel features thereof will be particularly pointed out in the annexed claims.

In the drawings, Fig. 1 is a block diagram of a conventional radiation detector system, using a multivibrator to supply power for the survey instrument or probe.

Figure 2:
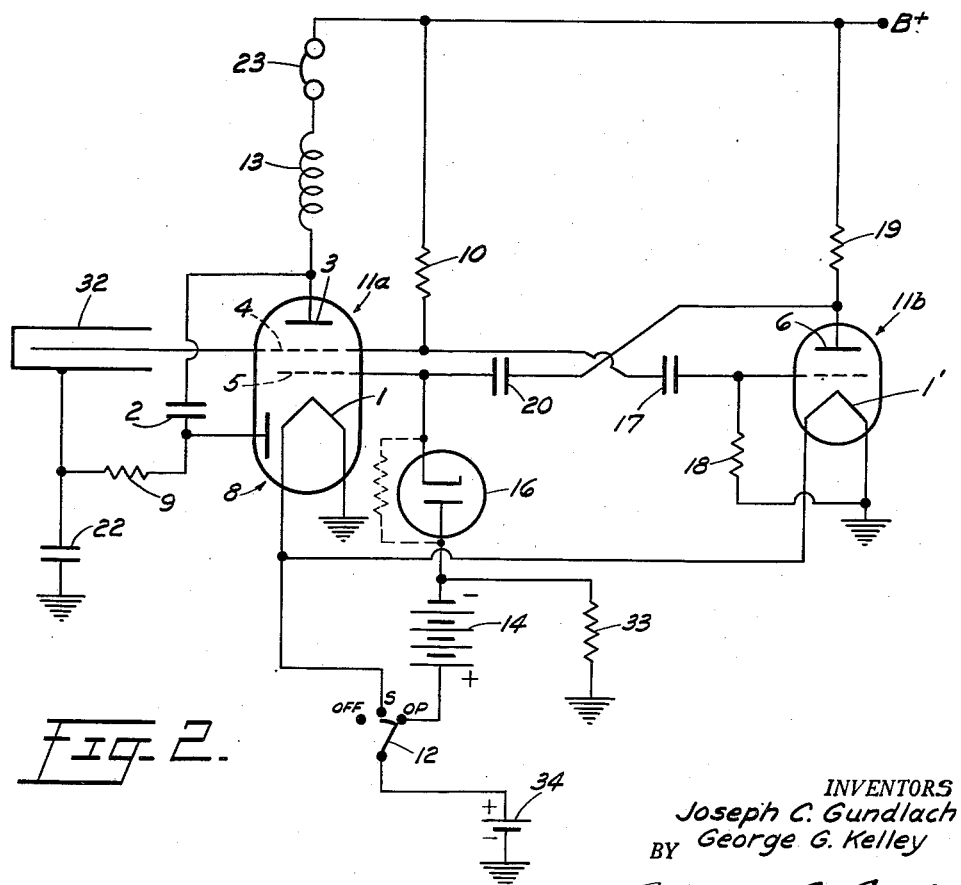

Fig. 2 is a schematic of a radiation detector system using our improved power supply circuit.

Referring now to the drawings in detail, 25 designates a pulse type of radiation detector such as a Geiger-Mueller tube, coupled to a conventional type of radiation detecting system. While power could be supplied to the system by any suitable source such as a large battery bank or the usual vibrator, this system is shown with the conventional multivibrator 26 which is coupled to the radiation detector or Geiger-Mueller tube 25 through a coupling resistor 28. The multivibrator is operated from a source of potential 27, such as a battery. The output of the Geiger-Mueller tube is coupled through condenser 29 to pulse amplifier 30 and this feeds into a sound reproducing device, such as a loud speaker or pair of earphones 31. In its operation, a nuclear event creates ionization in the Geiger-Mueller tube 25, and a discharge will occur since the multivibrator 26 serves to apply a substantial potential through resistor 28 to the anode or inner electrode of the tube. This discharge is coupled through condenser 29 to the pulse amplifier 30 where it is amplified and then preferably fed to earphones or loud speaker, 31. Upon reaching the earphones 31, it is converted into an audible sound corresponding to the pulse produced by the Geiger-Mueller tube 25.

It will be noted that this conventional system requires both a multivibrator and a pulse amplifier for proper operation. It is applicants' purpose to reduce the number of vacuum tubes, and therefore the power requirements of the system by combining these functions into a single multivibrator circuit. It is also intended to improve the operation of the system by always maintaining the voltage to the Geiger-Mueller tube at the desired level, and this is accomplished by restoring the same amount of charge to the storage condenser as was removed therefrom by the operation of the system in detecting a nuclear event.

Now referring to Fig. 2 showing applicants' system, a detector which preferably takes the form of a conventional Geiger-Mueller tube is indicated at 32. The outer electrode or cathode of detector 32 is connected to ground through a storage condenser 22. The anode or center electrode of the detector 32 is coupled directly to the grid 4 of the pentode 11a and through a resistance-capacitance coupling 18, 17 to the control grid of triode 11b. Proper potential is maintained on the grid 4 by the drop through the resistor 10 which couples it to B+. The plate 3 of the pentode 11a is coupled through inductance 13 and a sound reproducing device such as a loud speaker or earphones 23 to a source of B+ supply. It is also coupled through condenser 2 and resistor 9 to the ungrounded side of the storage condenser 22. Diode 8 is connected as a clamp by having its anode coupled between resistor 9 and condenser 2. The control grid 5 of pentode 11a is coupled to the plate or anode of the tube 11b through the coupling condenser 20 and to ground through diode 16 and resistor 33. Power for heating the filament 1 of pentode 11a is supplied through the strap type switch 12 from battery 34 in either the middle or right position of the arm of the switch 12. Proper potential is maintained on the anode 6 of tube 11b by means of the load resistor 19 which serves to couple it to the source of B+ potential. Current for heating the filament 1' of tube 11b may be obtained from the same source as that employed to energize filament 1.

In its operation, the capacitor 22 is charged by first turning the arm of strap switch 12 to the middle contact "S" or start position. With the contact arm of switch 12 on the middle contact, a circuit is completed from ground through battery 34 and filaments 1, 1' back to ground, causing these filaments to be energized. Tubes 11a and 11b then operate as a free-running multivibrator, with time constants chosen to provide optimum charging time for inductance 13. In each cycle, the cutoff of tube 11a causes a very large positive pulse to appear at plate 3. The charge on inductance 13 is transferred to capacitor 2 as the pulse rises, and is further transferred to storage capacitor 22 as the pulse falls, charging it to about 1100 volts negative with respect to ground. Diode 8 acts as a clamp and prevents the voltage at the junction of capacitor 2 and resistor 9 from rising above ground during the rise of the pulse. After a brief charging period, the arm of switch 12 is turned to the "OP" or operate position, causing the strap to bridge the middle contact and right end contact to complete a circuit from grid 5 through diode 16 and battery 14 back to the cathode 1. The negative potential of the battery 14 is applied to the grid through the diode 16 and cuts off tube 11a, so that the circuit now acts as a single shot multivibrator.

Assume that a nuclear radiation then strikes the counter tube 32 and initiates a discharge. The energy of the output pulse depends upon the over-voltage impressed on the counter. The negative output pulse at grid 4 is coupled through capacitor 17 and resistor 18 to the grid of triode 11b, which is conducting, cutting that tube off. The positive pulse appearing at plate 6 is then coupled back through capacitor 20 to grid 5, and tube 11a becomes conducting. As current flows through this tube, it charges inductance 13 again.

The time constant of the R–C network 17, 18 is chosen to equal the optimum charging time of the inductance 13, so that by the time the grid of triode 11b recovers to the point of cutoff, the inductance is fully charged. Then the tube 11b will begin conducting, producing a negative pulse at plate 6. This pulse is coupled through capacitor 20 to cut off tube 11a. The charge on the inductance 13 is again transferred to the storage capacitor 22 as described above.

It may be seen that the radiation detection pulse itself actuates the voltage supply circuit for the Geiger-Mueller tube 32. Moreover, the circuit is self-regulating over the life of the Geiger-Mueller tube, because the charge delivered to the storage capacitor 22 each time a pulse occurs is constant. If the Geiger threshold voltage of the tube should rise, a smaller pulse would appear at grid 4 because of the resulting lower over-voltage. Then delivery of the charge from inductance 13 to capacitor 22 would raise the voltage thereon above its previous level, because only the smaller charge has been given up in the pulse or discharge. This voltage rise will compensate for the rise in threshold voltage, and will accordingly keep the over-voltage substantially constant. Therefore, temperature and age effects on the Geiger-Mueller tube are exactly compensated by the inherent operation of the circuit.

A further important feature of this circuit is that the leakage across the storage capacitor 22, and the Geiger-Mueller tube terminals, which would normally dissipate the batteries in conventional portable instruments, is compensated for by utilizing intermittent tube discharges caused by cosmic radiations or other "background" radiation. These random discharges are made to serve a useful purpose; they occur sufficiently often to keep the capacitor charged to above the Geiger threshold potential even when the instrument is not actually detecting a local source.

From the foregoing, it is apparent that this multivibrator arrangement conserves power by only charging the storage condenser 22 when this is needed in order to maintain a sufficient charge to overcome threshold potentials and insure reliable operation. This is in contrast to the conventional power supplies which continuously attempt to charge the storage condenser whether such charge is needed or not. Dissipation of power also occurs in these systems through the use of a voltage divider network bridged across the storage condenser to provide desired operating potentials at different points therealong. The voltage divider constitutes a continuous load on the power system, always drawing at least a minimum amount of current which provides a constant drain on the batteries. This is obviated by applicants' unique power supply arrangement which eliminates the necessity for such a voltage divider.

In one preferred arrangement of the system of Fig. 2, a loud speaker was employed to reproduce the pulses, although a count rate indicating meter could have been employed. The system included three batteries and three electron tubes, i. e., a diode, triode, and a pentode. A multi-unit tube of the type 1D8 could be employed, or three subminiature tubes, each requiring only 10 milliamperes of filament current, would serve the purpose.

Having thus described our invention, we claim:

1. A system for detecting radiation comprising a Geiger-Mueller detector for producing pulses, a multivibrator for supplying power to the detector, means in the multivibrator circuit for supplying a large voltage, a storage circuit for supplying power to the detector, and means for coupling the multivibrator to the storage circuit for supplying a charge when the multivibrator operates from the multivibrator to the storage circuit.

2. A radiation detecting system comprising a detector responsive to radiations for producing pulses, a sound reproducing device for converting pulses into audible indications, a storage circuit coupled to the detector for supplying power thereto, and a circuit for coupling the sound reproducing device to the detector, including means responsive to the operation of the coupling circuit for transferring a charge to the storage circuit to raise its voltage each time a pulse from said detector passes through the coupling circuit.

3. A radiation detecting system comprising a detector responsive to radiations for producing pulses, a storage capacitor for supplying power to the detector, a sound reproducing device for converting pulses into audible indications, a circuit including a multivibrator for coupling the pulses from the detector into the sound reproducing device, said multivibrator producing a large voltage pulse on each operation, and means coupled to the storage capacitor for transferring the voltage pulse from the coupling circuit to the storage capacitor each time the multivibrator operates to generate a larger voltage on the storage capacitor.

4. A radiation detecting system comprising a Geiger-Mueller detector responsive to radiation for producing pulses, a storage circuit for supplying power for the detector, an indicating device for converting said pulses to indications, an amplifying circuit for coupling the indicating device to the detector, said amplifying circuit including a common source of low voltage power, and a feeder circuit for coupling the amplifying circuit to the storage circuit to transfer charge from the amplifying circuit to the storage circuit to raise the charge thereon in response to the passage of pulses through said amplifying circuit.

5. A radiation detector system comprising a detector responsive to radiation for producing pulses, a storage circuit for supplying power to the detector, a single shot multivibrator fed by the detector, an indicator coupled to the multivibrator for converting pulses into indications, and means for coupling the multivibrator to the storage circuit and responsive to each operation of the multivibrator for transferring charge from the multivibrator to the storage circuit to generate a higher voltage.

6. A radiation detector system comprising a detector responsive to radiation for producing pulses, a storage circuit for supplying power to the detector, an indicator for converting pulses into indications, a circuit for coupling the indicator to the detector, an inductance in the coupling circuit and responsive to pulses passing therethrough for producing large voltages, and means for feeding the output of the inductance from the coupling circuit to the storage circuit to recharge it.

7. A radiation detecting system comprising a detector responsive to radiation for producing pulses, a storage circuit for supplying power to the detector, a single shot multivibrator fed by the detector, a sound reproducing device coupled to the multivibrator for converting pulses into sound indications, an inductance in the multivibrator for producing large voltage pulses in response to each operation of the multivibrator, and a feeding circuit for coupling the voltage pulses from the inductance of the multivibrator into the storage circuit for recharging it.

8. A radiation detector system comprising a detector responsive to radiations for producing pulses, a storage circuit including a storage capacitor connected to the detector for supplying power thereto, a single shot multivibrator circuit fed by the detector, an indicator in the output circuit of the multivibrator for converting pulses into intelligence, an inductance in said output circuit for producing large voltage pulses in response to the operation of the multivibrator, and a circuit for coupling the inductance of the multivibrator to the storage capacitor for transferring said voltage pulses from the inductance to the storage capacitor to recharge it.

9. A radiation system comprising a detector responsive to radiation for producing pulses, a storage circuit connected to the detector for supplying power thereto, an indicator for converting the pulses into indications, a multivibrator for coupling the detector to the indicator including means for producing large voltage pulses upon each operation thereof, and a circuit for capacitatively coupling the multivibrator to the storage circuit to charge the storage circuit as pulses pass through the system.

10. A radiation detector system comprising a detector responsive to radiation for producing pulses, a storage circuit connected to the detector for supplying power thereto, an indicator for converting the pulses into indications, an amplifier circuit for coupling the detector to the indicator, said amplifier circuit including a multivibrator for producing large voltage pulses in an output thereof, a transfer circuit for capacitatively coupling said multivibrator output to the storage circuit for transferring the voltage pulses thereto, and a clamp coupled to the transfer circuit for limiting the rise in voltage therein during the initial formation of the voltage pulses in the multivibrator.

References Cited in the file of this patent
UNITED STATES PATENTS

| | | |
|---|---|---|
| 2,506,435 | Rossi et al. | May 2, 1950 |
| 2,550,488 | Marsh | Apr. 24, 1951 |
| 2,653,248 | Perlow et al. | Sept. 22, 1953 |
| 2,665,386 | Krasnow et al. | Jan. 5, 1954 |
| 2,735,947 | Molloy | Feb. 21, 1956 |
| 2,752,508 | Zito | June 26, 1956 |

OTHER REFERENCES

Brown: "Theory and Operation of Geiger-Mueller Counters—III, The Circuits," from Nucleonics, October 1948, pages 46–61, particularly pages 55 and 56.

Huntoon: "A Portable High Voltage Supply," from Review of Scientific Instruments, June 1939, pages 176–178.

Kaiser: "A completely Portable Radioactivity Meter Requiring No High Voltage Battery," from Review of Scientific Instruments, July 1939, pages 218 and 219.